(12) United States Patent
Kokko et al.

(10) Patent No.: US 8,381,899 B2
(45) Date of Patent: Feb. 26, 2013

(54) APPARATUS FOR STORING ROLLING MATERIAL IN A PILE AND RECLAIMING FROM THE PILE

(75) Inventors: Pekka Kokko, Hollola (FI); Heikki Ohvo, Hollola (FI)

(73) Assignee: Andritz Oy, Helsinki (FI)

( * ) Notice: Subject to any disclaimer, the term of this patent is extended or adjusted under 35 U.S.C. 154(b) by 160 days.

(21) Appl. No.: 12/997,740

(22) PCT Filed: Jun. 10, 2009

(86) PCT No.: PCT/FI2009/050495
§ 371 (c)(1),
(2), (4) Date: Dec. 13, 2010

(87) PCT Pub. No.: WO2009/150301
PCT Pub. Date: Dec. 17, 2009

(65) Prior Publication Data
US 2011/0094857 A1 Apr. 28, 2011

(30) Foreign Application Priority Data
Jun. 11, 2008 (FI) .................................... 20080401

(51) Int. Cl.
*B65G 65/02* (2006.01)
(52) U.S. Cl. .................. 198/508; 198/511; 198/513
(58) Field of Classification Search .................. 198/508, 198/510.1, 511, 513
See application file for complete search history.

(56) References Cited

U.S. PATENT DOCUMENTS

| 3,621,978 A | * | 11/1971 | Smith ........................... 198/506 |
| 3,794,387 A | | 2/1974 | Christensen et al. |
| 4,629,060 A | * | 12/1986 | Schlegel et al. ............... 198/508 |
| 6,095,742 A | | 8/2000 | Campbell |
| 2005/0040015 A1 | * | 2/2005 | Schlegel et al. ............... 198/519 |
| 2005/0155845 A1 | | 7/2005 | Webb |

FOREIGN PATENT DOCUMENTS

| AU | 197748559 | 6/1998 |
| DE | 92 12 512 | 12/1992 |
| DE | 197 50 773 | 5/1998 |
| EP | 0 090 981 | 10/1983 |
| WO | WO 03/086912 | 10/2003 |

OTHER PUBLICATIONS

International Search Report for PCT/FI2009/050495, mailed Feb. 9, 2010.
Written Opinion for PCT/FI2009/050495, mailed Feb. 9, 2010.

* cited by examiner

Primary Examiner — James R Bidwell
(74) Attorney, Agent, or Firm — Nixon & Vanderhye P.C.

(57) ABSTRACT

The invention relates to an apparatus for stacking rolling material, such as e.g. wood chips, bark or grain into a pile (10) and reclaiming from the pile (10) to a material-discharging conveyor (20) located below the storing point, which apparatus comprises a center column (30) that supports a stacker boom (40) and a reclaimer boom (50), an equalizing hopper (60), at least one conveyor (25) located in the equalizing hopper (60) for transmitting the material being discharged to the discharging conveyor (20). A characteristic feature of the apparatus is that the center column (30) is supported directly through the equalizing hopper (60) onto the bottom of the equalizing hopper's (60) foundation.

23 Claims, 3 Drawing Sheets

US 8,381,899 B2

APPARATUS FOR STORING ROLLING MATERIAL IN A PILE AND RECLAIMING FROM THE PILE

BACKGROUND

This application is the U.S. national phase of International Application No. PCT/FI2009/050495 filed 10 Jun. 2009 which designated the U.S. and claims priority to FI Patent Application No. 20080401 filed 11 Jun. 2008, the entire contents of each of which are hereby incorporated by reference.

The present invention relates to an apparatus for storing rolling material in an open storage pile and more specifically to an apparatus for stacking and reclaiming material, i.e. to a stacker/reclaimer. Most preferably the invention relates to storing of wood chips, but it is applicable for storing other granular material such as wood bark, coal, corn or fine-grained material.

Storage piles are needed for homogenizing the material and on the other hand for blending possibilities. The stacker/reclaimer for this kind of storage pile comprises e.g. a center column, a stacker conveyor and a reclaimer conveyor. The center column supports concentrically the upper stacker conveyor and the lower reclaimer conveyor. The stacker conveyor adds loose material in the pile, while the reclaimer conveyor conveys the material from the pile towards the slewing center of the stacker/reclaimer. In the slewing center the material to be discharged is transferred to an underground conveyor removing the material. Thus, the stacker/reclaimer is rotatable and creates an arched pile around itself.

In prior art stacker/reclaimers the center column is support with inclined, massive steel and concrete supports onto an equalizing hopper or onto the ground surface. Additionally, the concrete construction of the center column extends up to the slewing hinge. This kind of construction is heavy and expensive to build, as all the forces of the center column, also vertical, must be supported with inclined supports.

In known solutions, with a typical reclaiming capacity of 500-2500 i-m$^3$/h (=loose cubic meters per hour, e.g. chips), the depth of the equalizing hopper's foundation has to be approximately 6 meters due to the construction of the stacker/reclaimer. A deep equalizing hopper often causes difficulties. In many places water is met closer to the ground surface, which makes digging the tunnel and the equalizing hopper difficult and expensive. Even if groundwater would not cause a problem, making a deep equalizing hopper and a tunnel is in every case expensive with massive earth-moving work. In addition, the support of the center column requires a large amount of steel and it is challenging in constructional view, and expensive to build.

SUMMARY OF INVENTION

A totally novel type of equalizing hopper and center column of a stacker/reclaimer has been developed. The center column of the stacker/reclaimer is supported directly to the bottom the equalizing hopper foundation between or beside the conveyors through the equalizing hopper, whereby vertical forces can be directed directly to the ground. This allows using significantly simpler and lighter support constructions than in prior art solutions. The base plate of the foundation, on which the center column is supported, is dimensioned so thick that it can carry the vertical loads and so wide that it can transmit the vertical loads to the ground. In accordance with the conditions (size of the storage, load bearing capacity of the ground etc.) the plate can easily be built adequately wide. Lateral support is arranged onto the walls of the equalizing hopper's foundation. Further, in accordance with the invention the center column is supported against lateral loads on an upper level, in the vicinity of the bottom level of the storage place, i.e. close to the ground level to the walls of the equalizing hopper's foundation with lateral support beams and intermittent walls made of concrete and steel. Symmetrical constructions lead to symmetrical loadings of the walls. The wall surfaces, in turn, together with the bottom plate, contribute to the stabilization of the foundation to be solid in relation to the surrounding ground. This kind of construction according to the invention is also significantly easier to implement, due to its simplicity and its forms that are constructionally clear and advantageous.

In a solution according to the invention, the number of conveyors that transfer the reclaimed material from the reclaimer conveyor to the discharging underground conveyor can be one or more, preferably two. These conveyors can be screw conveyors or other conveyors suitable for the purpose.

A solution according to the invention allows building the equalizing hopper symmetrical, with optimal dimensions. Symmetricity, in turn, is advantageous in view of the strength of the structures and additionally it allows using similar conveyors and components. Under the ground surface the form of the center column is essentially quadrangular, preferably square, whereby it is easier and cheaper to construct. The part of the center column that is above ground level is, after the transfer zone, according to the invention constructed of steel, with an essentially circular cross section. The support according to the invention allows building the equalizing hopper low, even-down to approximately 4.5 meters, whereby the problems of prior art are avoided.

Advantages that may be achieved with the invention include e.g. the following:
  The linear and simple forms of the center column and the hopper are advantageous for concrete constructions.
  Varying the thickness and size of the foundation's base plate allows managing with small constructional changes in the support of stacker/reclaimers of different size and with the requirements of grounds with different load-bearing capacities.
  Due to symmetrical foundation of the equalizing hopper, the lateral support of the center column can be located advantageously to the walls and upper edge of the foundation.
  The equalizing hopper and the conveyors can freely be installed from above downwards to the foundation.
  The conveyors, such as screws and driving components can easily be lifted up due to the open construction.

SUMMARY OF DRAWINGS

In the following, the invention is disclosed in more detail with reference to the appended figures, of which

DETAILED DESCRIPTION OF EMBODIMENT OF INVENTION

Figure 1:
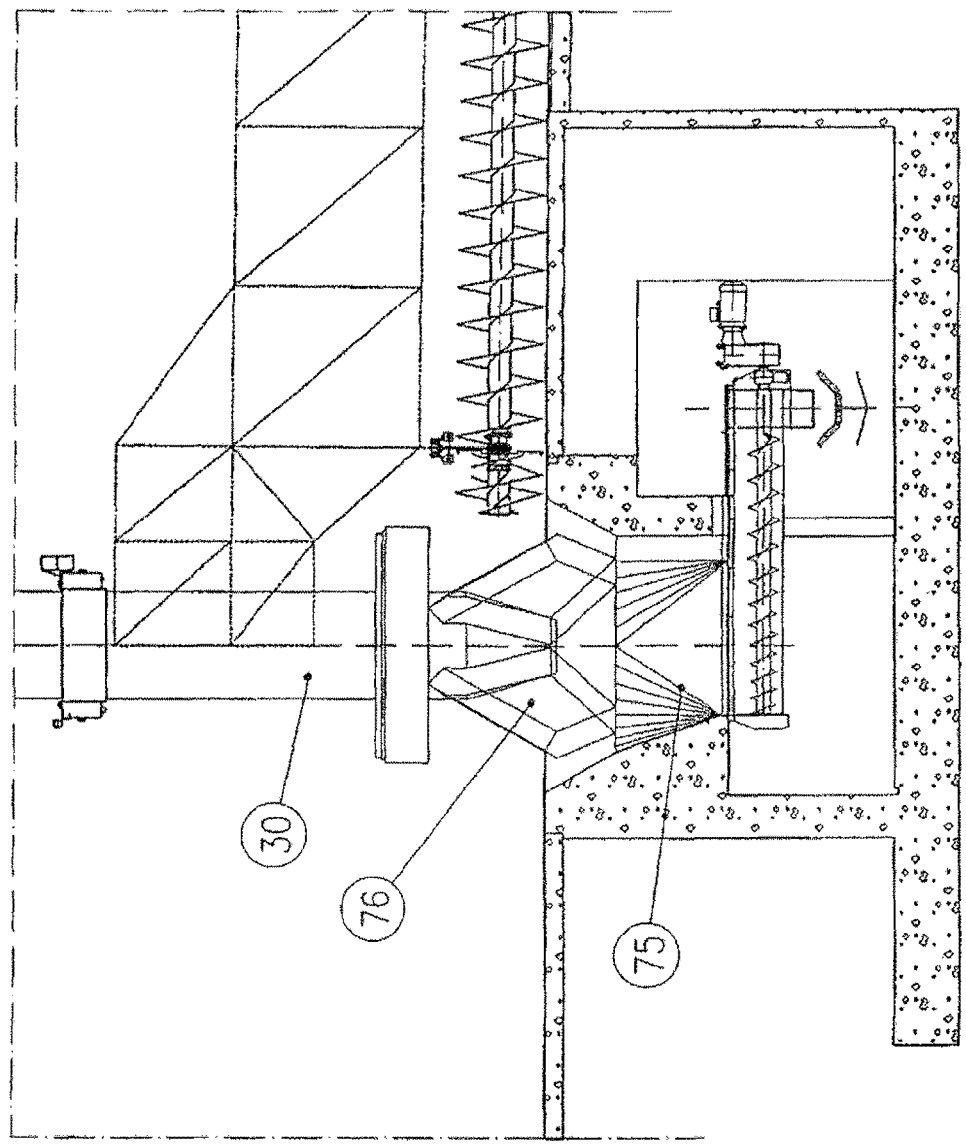
FIG. 1 illustrates a prior art center column of a stacker/reclaimer and the support thereof.

FIG. 1 illustrates a prior art stacker/reclaimer. The center column 30 of the stacker/reclaimer is supported onto walls of the equalizing hopper 75/onto the ground surface with concrete and steel constructions (stems) 76. The center column has a circular shape. Conveyors are arranged below the center column for transferring reclaimed material to a discharge conveyor. The equalizing hopper is rectangular in shape and with a maximum discharging capacity of approximately 2500i-m3/h it is mounted on a foundation approximately 6 meters deep.

Figure 2:
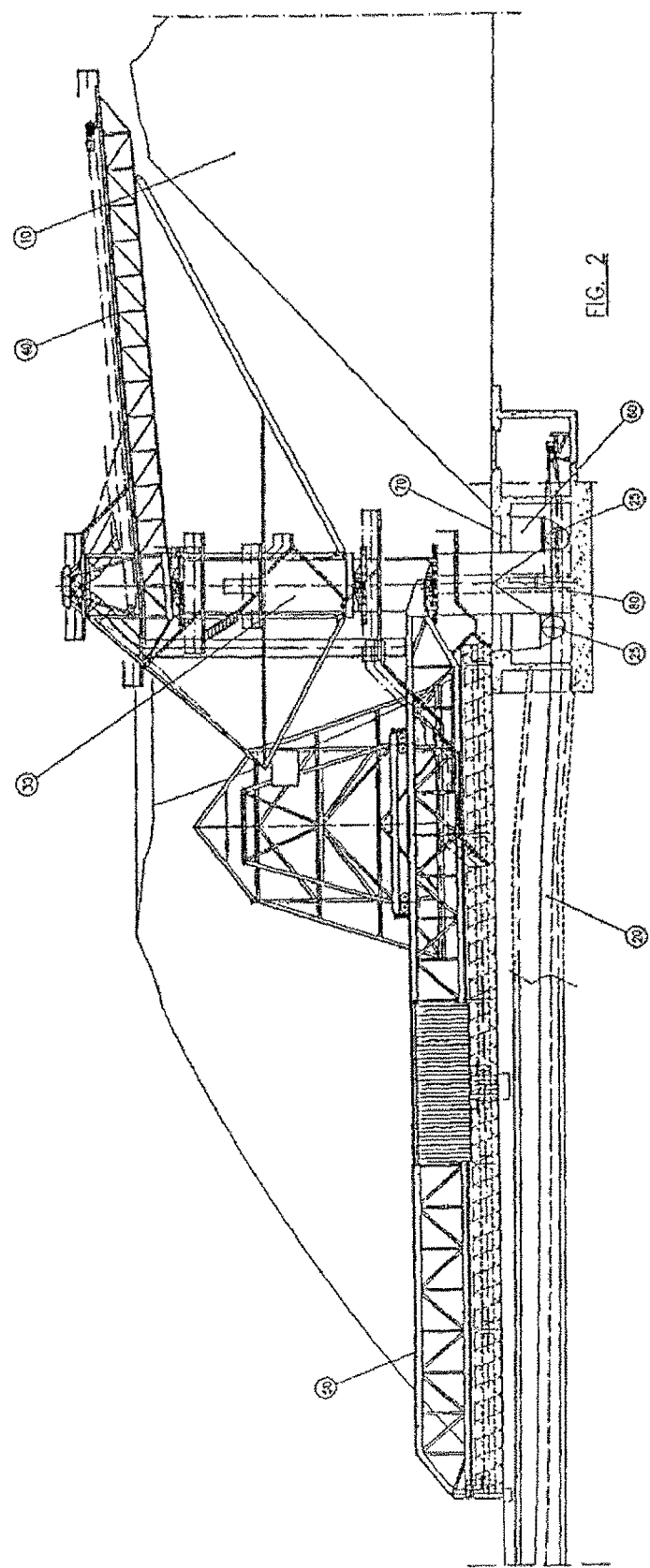
FIG. 2 illustrates the center column of the stacker/reclaimer according to an embodiment of the invention and the support thereof in partial cross section (in side view)

FIG. 2 illustrates a solution according to an embodiment of the invention, with an apparatus for stacking rolling material, such as wood chips, in a pile 10 and reclaiming from the pile 10 to a discharging conveyor 20 below the storing point. The stacker/reclaimer comprises a center column 30, whereon a stacker boom 40 and a reclaimer boom 50 are supported. Further the apparatus comprises an equalizing hopper 60 having at least one conveyor 25, preferably a screw conveyor, but some other kind of conveyor can also be used, for transferring reclaimed material to the conveyor 20. The center column 30 is supported vertically directly onto the bottom of the equalizing hopper's 60 foundation through the equalizing hopper beside the conveyor 25 or between the conveyors 25. The number of the conveyors, e.g. screw conveyors 25 can be one or more, preferably two, beside or between which the center column is supported onto the bottom plate of the foundation. Alternatively, the conveyors 25 can be arranged into the equalizing hopper 60 also beside the center column 30 at one or more sides. Also, in the solution according to the invention, the lateral support of the center column 30 is effected with supports 70 and support walls 80 onto the walls of the equalizing hopper's 60 foundation as close to the bottom level of the storing point (ground surface) as possible, i.e. at the uppermost possible point in relation to the base plate for achieving maximum firmness.

Figure 3:
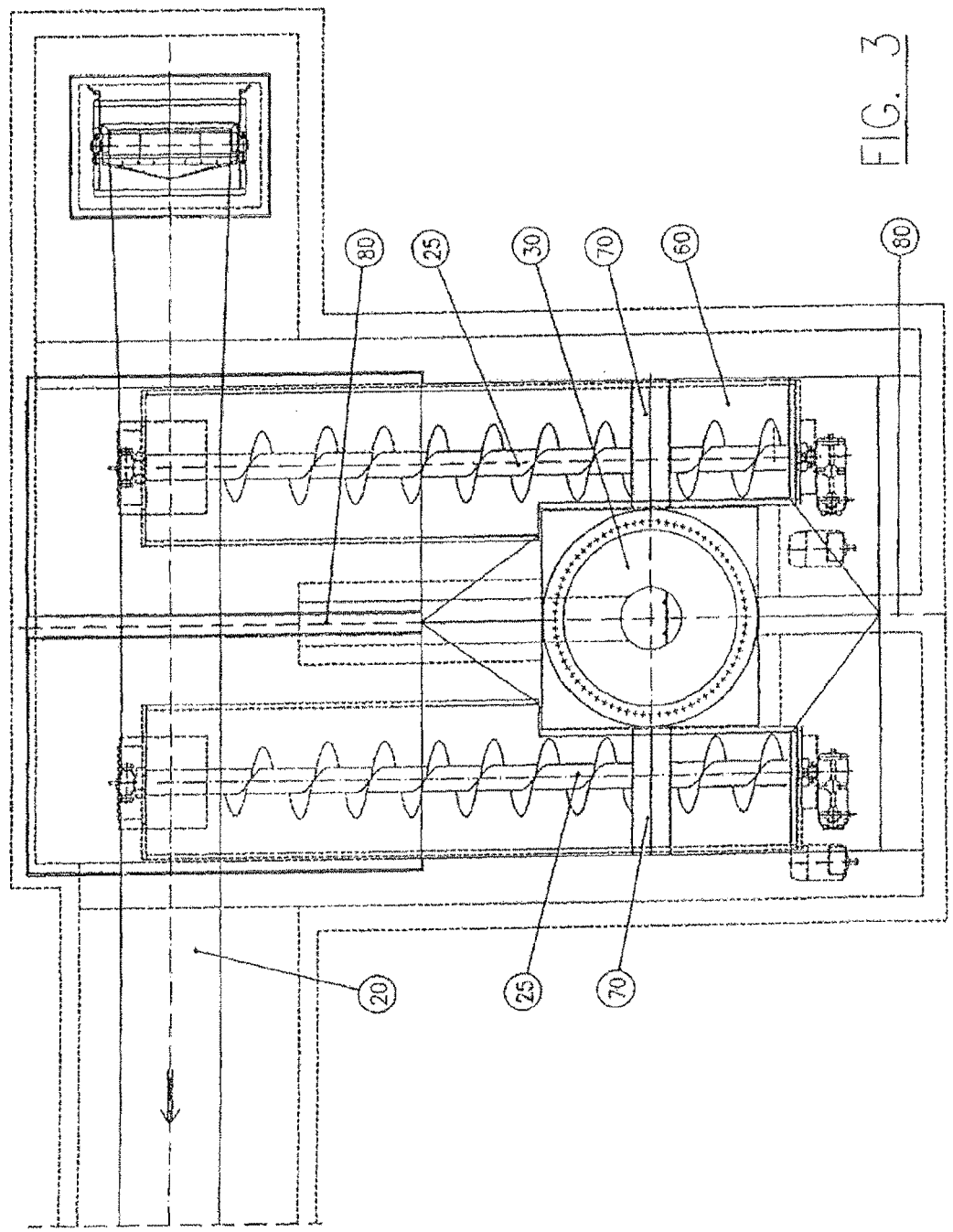
FIG. 3 illustrates an equalizing hopper according to an embodiment of the invention from above.

FIG. 3 illustrates a detail of FIG. 2 from above. FIG. 3 illustrates an equalizing hopper 60 according to an embodiment of the invention. In the figure the center column 30 is supported between two screw conveyors 25 and by means of lateral supports 70 onto the walls of the equalizing hopper's foundation, as well as by means intermittent walls 80 parallel to the screw conveyors onto the base plate and end walls of the foundation. The conveyors 25 transfer the reclaimed material to an underground discharging conveyor 20. The equalizing hopper 60 is symmetrical. In the figure the center column 30 according to an embodiment of the invention has an underground cross section that is essentially a square and a cross section above the ground surface that is essentially circular. An emergency exit at the end of the discharging conveyor tunnel and below the equalizing hopper 60 is arranged via a vertical shaft passing through the center of the center column 30 to the working platform of the stacker. An entrance inside the center column 30 is arranged on the bottom level by means of a passage through the center wall construction of the center column, whereby the solution does not endanger the firmness of the center column.

Although the above description relates to an embodiment of the invention that is in the light of present knowledge considered the most preferable, it is obvious to a person skilled in the art that the invention can be modified in many different ways within the broadest possible scope defined by the appended claims alone.

The invention claimed is:

1. An apparatus for stacking rolling material onto a pile and discharging from the pile to a discharging conveyor located below a storing surface supporting the pile, which apparatus comprises:
 a center column supporting a stacker boom and reclaimer boom,
 an equalizing hopper,
 at least one conveyor in and supported by the equalizing hopper, said at least one conveyor transferring the rolling material being reclaimed from the pile to a discharging conveyor,
 wherein the center column is supported directly through the equalizing hopper onto the a bottom of a foundation of the equalizing hopper and the center column is supported by at least one lateral support extending from a wall of the foundation.

2. An apparatus according to claim 1, wherein the at least one conveyor is beside a side of the center column.

3. An apparatus according to claim 1, wherein the at least one conveyor includes a plurality of conveyors each arranged beside the center column.

4. An apparatus according to claim 1, wherein the at least one conveyor is a plurality of conveyors, and the center column is between at least two of the plurality of the conveyors.

5. An apparatus according to claim 1 wherein the at least one conveyor includes a screw conveyor.

6. An apparatus according to claim 1, wherein the at least one lateral support extends across the equalizing hopper.

7. An apparatus according to claim 1, wherein the center column is supported by support walls at the bottom and by walls of the foundation.

8. An apparatus according to claim 1, wherein the equalizing hopper is symmetrical.

9. An apparatus according to claim 1, wherein the center column has a quadratic cross-section at an elevation below a ground level.

10. An apparatus according to claim 1, wherein the center column has a circular cross-section at an elevation above a ground level.

11. An apparatus according to claim 1, wherein the center column includes steel.

12. An apparatus according to claim 1, wherein an emergency exit from the foundation and below the equalizing hopper passes through the center column.

13. An apparatus according to claim 1 further comprising an emergency exit from the foundation and below the equalizing hopper passes through the center column and a support wall.

14. An apparatus to discharge granular material from the pile on a support surface to a discharging conveyor below the storing surface, the apparatus comprises:
 a vertical center column
 a reclaimer boom supported by the center column and extending radially from the center column, above the storing surface and adjacent to a lower edge of the pile,
 an equalizing hopper adjacent to the center column and below the storing surface, wherein the equalizing hopper receives the granular material moved by the reclaimer boom towards the center column, and
 a horizontal conveyor in the equalizing hopper extending from a position adjacent the center column to a position proximate to the discharging conveyor, wherein the horizontal conveyor is supported by the equalizing hopper;
 wherein the center column is supported on a foundation surface which supports the equalizing hopper and the center column is supported by at least one lateral support extending from a wall of the foundation.

15. The apparatus of claim 14 further comprising a second equalizing hopper having a second horizontal conveyor, and the center column is between the equalizing hopper and the second equalizing hopper.

16. The apparatus of claim 15 wherein the equalizing hopper and the second equalizing hopper are arranged symmetrically about the center column.

17. The apparatus of claim 14 wherein the horizontal conveyor includes a screw conveyor.

18. The apparatus of claim 14 wherein the lateral support extends across the equalizing hopper.

19. The apparatus of claim 14, wherein the center column is supported by a support wall extending up from the foundation surface and the support wall is parallel to the equalizing hopper.

20. The apparatus of claim 14, wherein the center column has a quadratic cross-section at an elevation below the foundation surface.

21. The apparatus of claim 14, wherein the center column has a circular cross-section at an elevation above the foundation surface.

22. The apparatus of claim 14 wherein the center column is formed of steel.

23. An apparatus configured to stack rolling material on a pile and discharge the material from the pile to a discharging conveyor located below a surface supporting the pile, wherein the apparatus comprises:

a center column supporting a stacker boom and reclaimer boom;

a foundation defining a pit below an elevation of the surface supporting the pile, wherein the foundation includes a floor and a sidewall;

an equalizing hopper defined by or in the foundation, supported by the foundation and configured to receive the rolling material from the pile, and a first conveyor within the equalizing hopper and configured to transfer the rolling material from the hopper to a second conveyor extending out from the equalizing hopper and from the foundation, wherein the center column extends through the equalizing hopper, stands on and is supported directly by the floor, and is supported laterally by a lateral support extending from the sidewall to the center column.

* * * * *